Figure 1:
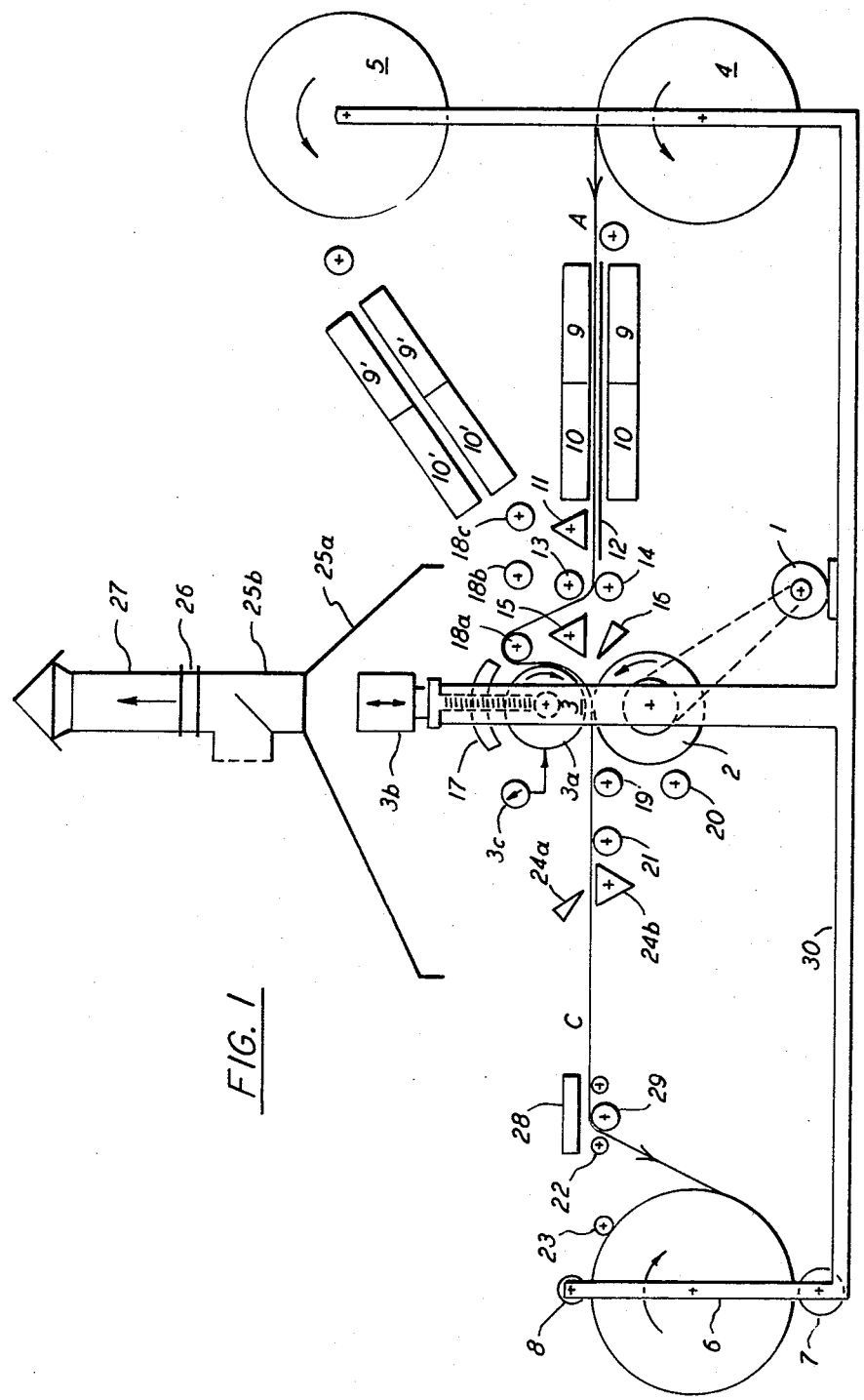

United States Patent [19]

Rehlen et al.

[11] 4,364,892
[45] Dec. 21, 1982

[54] PROCESS FOR SURFACE TREATMENT OF FOAMED SHEETS

[76] Inventors: Helmut Rehlen, Härte 6, 7951 Ingoldingen; Jürgen Roellinghoff, Fohrenweg 9, 7950 Biberach-Mettenberg, both of Fed. Rep. of Germany

[21] Appl. No.: 59,357

[22] Filed: Jul. 20, 1979

[30] Foreign Application Priority Data

| Jul. 25, 1978 | [DE] | Fed. Rep. of Germany | ... 7822256[U] |
| Jul. 25, 1978 | [DE] | Fed. Rep. of Germany | ... 7822259[U] |
| Jul. 25, 1978 | [DE] | Fed. Rep. of Germany | ... 7822264[U] |
| Jul. 25, 1978 | [DE] | Fed. Rep. of Germany | ... 7822278[U] |
| Jul. 25, 1978 | [DE] | Fed. Rep. of Germany | ... 7822284[U] |

[51] Int. Cl.³ .................. B29C 17/00; B29D 27/00
[52] U.S. Cl. .................. 264/284; 156/209; 156/269; 156/270; 156/279; 156/309.9; 156/322; 156/324; 156/498; 156/499; 264/321; 428/218; 428/310.5; 428/314.2; 428/316.6; 428/409
[58] Field of Search .................. 156/82, 309.9, 209, 156/269, 322, 324, 498, 499; 264/48, 321, 280, 284; 428/315, 218, 409, 310.5, 314.2, 316.6

[56] References Cited

U.S. PATENT DOCUMENTS

| 3,062,698 | 11/1962 | Aykanian | .................. 156/309.9 X |
| 3,205,120 | 9/1965 | Flanders | .................. 156/309.9 X |
| 3,239,399 | 3/1966 | King | .................. 156/82 |
| 3,422,172 | 1/1969 | Dekker | .................. 264/48 X |
| 3,582,430 | 6/1971 | Benigno | .................. 156/309.9 |
| 3,890,414 | 6/1975 | Ricciardi et al. | .................. 264/48 X |
| 3,998,683 | 12/1976 | Benton | .................. 156/164 |
| 4,070,435 | 1/1978 | Lewicki et al. | .................. 264/284 |
| 4,091,154 | 5/1978 | Hirai | .................. 264/48 X |
| 4,280,978 | 7/1981 | Dannheim et al. | .................. 264/284 X |

*Primary Examiner*—Robert A. Dawson
*Attorney, Agent, or Firm*—Ladas & Parry

[57] ABSTRACT

A process for the continuous modification of the surface portion only of a foamed plastic web to impart high mechanical resistance with retention of air permeability and elasticity comprises preheating the web to a temperature below its melting point, passing the preheated web through the nip of a calendar and withdrawing the web from the calender under tension. The calendar comprises a pressure roller heated to a temperature above the melting point of the web and a backing roller which is not heated.

4 Claims, 2 Drawing Figures

PROCESS FOR SURFACE TREATMENT OF FOAMED SHEETS

The invention concerns a process for the surface treatment of foamed sheets in which the physical properties of the foam are on no account disadvantageously affected, but several properties can even be improved.

Due to the small mechanical resistance and porous surface in the original state, foamed plastics have a limited application. In order to widen their application range, the foamed sheet is superficially connected with other laminar materials (e.g. fabrics, paper, films), or its structural quality is altered by fusing on the surface, or by changing the structural texture by reducing the pore volume.

All these processes known as lamination coating, leathering and compressing have the disadvantage that on the one hand they bring about the desired increase in strength or stabilization of the foamed sheet, but on the other hand they diminish or completely abolish important properties of the product. This, for instance, takes place in flame lamination coating or leathering when, by making use of the thermoplastic properties of a foamed sheet, a partial plastification of the foamed sheet is brought about. Thus, for instance, in the lamination coating a plastified layer is produced as a gummer by fusing on the surface to connect the foamed sheet with a laminar structure. In leathering fusing on the surface effects the formation of a hardened closed layer.

The enforced hardening of the plastified spots brings about considerable changes of the important physical properties of the foamed sheet, this in many cases being harmful to usage. Even when avoiding these processes by using other methods, for instance, gumming or forming a layer, nothing is changed because in all cases the media which are dealt with have other physical properties than the carrying foamed sheet.

The object of the invention is to treat the surface of the foamed sheets in such a way that the surface gets a high mechanical capability of resistance at a good elasticity. The air permeability and the elasticity of the product should especially be retained.

This problem is solved by drawing off a foamed sheet from a supply spool, heating it by means of a heating device, then guiding it by a calender consisting of a cooled supporting calender and a heated pressure roller, and by drawing it off and winding it up under a tension of from 1 to 10 percent. Said treatment of the foamed material not only provides the retention of the properties of the matrix but also improves such properties as the tensile strength, the resistance to gasoline, oil, grease and water as well as the resistance to corrosion, this opening up new fields of application.

The thus treated material is suitable, for instance, for table pads or table protectors, especially at hotels, restaurants and cafes, for sound reduction, as a sealing material in air conditioning installations, as a replacement for felt, for thermal insulation, as an insulating material in small machines and electric appliances, for sound reduction in the automotive or machine-building industry, as a fabric supporter for bandages or sanitary napkins, as a table baffle cloth for such games as football, billiards or such-like, as a bump (shock) protection in a car, for instance, in the trunk, as a carpet pad(ding) or interlayer, as a dish-cloth or duster, as a cloth for counters (or bars), or for the production of nonskid paddings.

The process also has another aspect, namely that various foams may be connected with one another without disadvantageously affecting the permeability to air or elasticity at this connecting layer. Thus, for example, polyester foam materials may be connected with polyether foamed sheets. However, it is also possible to put a textile material onto the surface of a thus treated sheet, so that in this way carpet bottoms (paddings) and similar materials may be easily produced.

If polyether and polyester are to be connected, the connection between both the products may be achieved without any essential fusing of the carrying polyether foam, since both the products have the same melting point. The fused polyester plastic is easily connected with the porous surface of the polyether foamed sheet, and may be optionally controlled as to the intensity of fusing.

Figure 2:
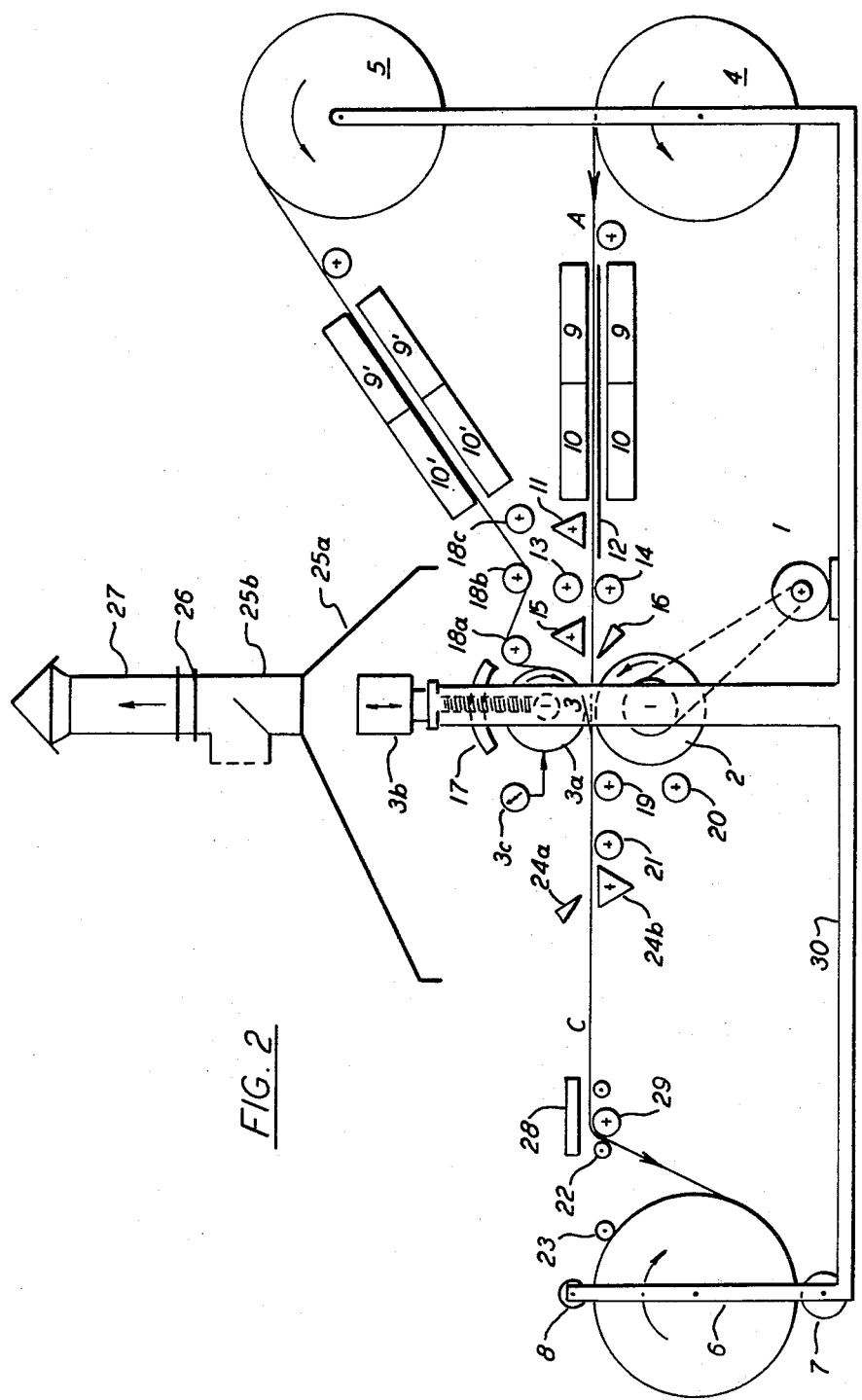

FIGS. 1 and 2 of the accompanying drawings show an apparatus suitable for carrying out the process according to the invention.

The drawings show that a supporting calender (2) is driven by a driving motor (1). The drive can as usually be provided with a variable speed gearing or a back gear, and the power transmission can take place through chains or belts which are maintained under tension by a suitable tensioning device.

Specific requirements must be met for the supporting calender (2) concerning its resistance to pressure, temperature, wear and tear, and solvent stability. The coating may be either firm or elastic, depending on the treated material. The supporting calender (2) is connected with a pressure roller (3) via a gear unit through which the relative number of revolutions of the supporting calender (2) and the pressure roller (3) are adjustable.

The pressure roller (3) driven by the supporting calender (2) may have a smooth, polished or mat surface; however, if a pattern is to be produced in the work material, a structured, e.g. grooved or perforated surface may be provided, either polished or mat. A hard-chromium plating has turned out to be an especially suitable coating, the roller may be highly polished or bronzed; however, it may also be coated with a temperature-resistant plastic or have a ceramic coating. Opposed to the supporting calender (2), suitably provided with a cooling installation, the pressure roller (3) is supplied with a heating installation. A detailed representation of said heating (3a) is not given in the drawing because it is a customary roller heating; for example, an integrated heating which is automatically regulated and controlled by a measuring device and a controller. Especially suitable is an electric heating, the current being conducted through slip rings over brushes. Heating by steam or by a flowing medium is, of course, also possible. The heating power should be so rated that temperatures up to 500° C. are achieved.

The arrangement (3c) in the drawing is used for temperature measurement and temperature control. The surface of the pressure roller is preferably automatically and continuously engaged by suitable contact measuring elements, their output being fed to the control arrangement. It has turned out to be especially useful to monitor the heating by pyrometers which can be employed as soon as a temperature has been reached at which the surface of the roller gives off sufficient thermal radiation.

The position of the pressure roller (3) is determined by an adjusting means. Known spindles, worms, worm wheels, shafts or chains may be used for these adjusting means driven by means of a geared engine.

Since a very precise adjustment of the gap between the rollers and of the pressure on the pressure roller is required, a precision instrument is advisable with which the pressure and the gap between the rollers (2) and (3) can be precisely aligned and maintained to the adjusted value.

The work material which is usually available in the form of a continuous sheet is drawn off from a supply spool (4) actuated by regulating and control units adjusting the tension of the sheet and its velocity.

As shown in FIG. 2, another supply spool (5) may be used for supplying another sheet which is in the gap between the rollers 2 and 3 joined to the sheet from the supply spool (4). The finished product is then wound onto a winding up device(6), said winding up device being provided with a rising winding up device (7) and a pit winding up device (8). At first the product drawn off from the supply spool (4) is guided via a sheet bearing device (12) in the direction of the arrow A, which device essentially consists of a horizontally arranged plate. At the beginning of said plate, above and beneath it, a heating device (9) is provided in which a controllable heat source is placed. This heating device is adjustable both as regards its distance to the product and as to its angle so that variable warming up conditions are possible. A pre-heating device (10) follows in the direction of travel of the work material, said pre-heating device preferably being a contactless thermal radiation source allowing a controllable and measureable, one-sided or two-sided surface heating of the work material.

Following is a shock heating device (11) above the sheet run (product path) in the direction of travel of the work material, said shock heating device being provided nearly at the end of the sheet bearing device (12). The shock heating device is adjustable in its angle and distance to the product, preferably being rotatable around its longitudinal axis so that it can affect the sheet beneath it and also the sheet drawn off from the supply spool (5). Like the sheet drawn off from the supply spool (4), the sheet drawn off from the supply spool (5) is guided by two devices disposed one after another, namely by a heating device (9') and a pre-heating device (10').

The shock heating device (11) is followed by a pair of guide rollers provided in the direction of travel of the sheet, the guide rollers being guide roller (13) and guide counter-roller (14). The guide roller (13) can fulfill different tasks: it can be used for the transportation of the product, for regulating the tension in the sheet, it can be used for determining the distance when supplying two sheet runs, it can be employed for effecting a specific pressure, and through it the angle directing the entry of one or two sheet runs into the calender gap may be varied.

By means of the guide counter-roller (14) together with the guide roller (13) a roller gap is defined through which the exact orientation of the sheet run or sheet runs is determined.

Between the pair of guide rollers and the supporting calender an auxiliary heater (15) is also provided above the sheet run and a cooling nozzle (16) beneath said sheet run. The auxiliary heater (15) corresponds in its structure to the shock device (11); however, it is so disposed that it is adjustable to act on the upper side of the sheet run or the surface of the pressure roller (3), or, if necessary, to act on both. The heating power can, of course, also be regulated and controlled. The cooling nozzle (16) covers the whole calender width, it is fed from a ventilator and is rotatable around its longitudinal axis. It is so adjustable that the surface of the supporting calender (2) can be cooled or the lower side of the sheet run of the sheet drawn off from the supply spool (4) can be cooled. However, the cooling of both the sheet run and the supporting calender is also possible.

In case the heating of the pressure roller (3) and the auxiliary heater (15) is not sufficient, an auxiliary roller heater (17) positioned above the pressure roller (3) may be switched on. Through said auxiliary roller heater especially temperature changes apparent at the surface of the pressure roller (3) may be balanced.

The guide rollers (19), (20) and (21) positioned after the roller gap are so provided that the rollers (19) and (21) support the sheet run when guided horizontally, whereas the roller (20) is disposed beneath the roller (19) and serves the adjustment of a suitable looping angle. The cooling is also affected by changing the looping angle, and in order to reach a prescribed cooling, said rollers, especially the roller (20), may be arranged adjustably so that the desired looping angle is precisely adjusted.

The roller (21) is, as a rule, employed as a carrying (supporting) roller and adjacent the roller (21) a cooling nozzle (24a) is provided above the sheet run. Beneath the sheet run an exhaust nozzle (24b) may be provided so that the air flow is forced through the sheet run, or is drawn off from it so that the entire volume of the product is cooled. Between this cooling nozzle and the winding up roller (6) a guide roller (22) is provided, a cutting device (29) being mounted directly in front thereof and cutting the product in the longitudinal direction. However, the cutting may also be carried out transversely to a sheet run, and the cutting device may be operated automatically or manually. A measuring device (28) is mounted above the guide roller (22), said measuring device establishing the dimensions of the finished product and eventually determining and controlling the thickness of the product. Further, at the periphery of the winding up device (6) a feeler- and guide roller (23) is provided, which, if necessary, may be assembled as one unit with the pit winding up device (8).

Since the apparatus is operable at comparatively high temperatures, it is necessary to provide a suction device for the fumes being formed. Said device includes a suction hood (25a) gathering the released exhaust gases and guiding them to an exhaust ventilator (26). To adjust the exhaust volume a by-adjusting device (25b) is provided between the suction hood (25a) and the ventilator (26). Adjacent the ventilator an exhaust chimney (27) is provided, said chimney being adapted to the capacity of the ventilator and providing for an undisturbed removal of the exhaust.

The whole apparatus is positioned on a support and a switch point is provided for its operation.

FIG. 1 shows an arrangement in which a single sheet is drawn off from a supply roller (4) and guided along the horizontal plane through the pre-heating device to the rollers (13), (14). After passing between the rollers (13), (14), the sheet passes over the roller (18a) and then passes downwardly, contacting the roller (3) with a looping angle of about 90° and passing between the rollers (2) and (3). After passing between the rollers the sheet, after leaving the supporting calender (2), may be guided downwards around the roller (19), thereby forming a small looping angle of about 90° around the supporting calender (2). In this way the lower surface of the sheet is more intensely cooled. A larger looping angle of about 90° may be attained by guiding the sheet leaving the supporting calender (2) around the guide roller (20). When the roller (20) is so disposed that it is vertically adjustable, other looping angles are also adjustable.

Instead of passing a single sheet from the supply roll (4) through the calender, two sheets, drawn from the supply rolls (4) and (5) respectively, may be passed through the calender together. As shown in FIG. 2, the upper sheet is guided over the roller (18c), under the roller (18b) and over the roller (18a), so that the upper sheet contacts the roller (3) with a looping angle of about 90° and passes between the rollers (2) and (3). The lower sheet is guided horizontally between the rollers (13) and (14) and into the calender gap, so that the sheets are brought together in the calender gap. The composite sheet leaving the calender may pass horizontally over the roller (19) or it may pass under the roller (19) or under the roller (20).

PRACTICAL EXAMPLES

The following Examples illustrate the versatile application possibilities of the process according to the invention.

EXAMPLE 1

In this Example a polyester foam is produced which is coated on one side. This foam is very suitable for sound reduction and absorption. This material may also be used together with other materials in heavy machine-building for trucks, cranes, agricultural machinery, etc., especially also as a sealing material. The starting material is a polyester foam having an initial weight of 55 kg/m$^3$. The product has a thickness of 15.7 mm and a porosity of 22 to 26 cells per centimeter. The coated surface is closed, smooth and lightly grained. The material may be dyed.

The process is carried out by working with a machine speed of 8 m/min. The tension of the product is 3%, the distance between the heating device (9) and the product is 5 mm, and the heating temperature is 200° C. The product is heated from underneath with the heating device which is disposed at a 10 mm distance and also has a temperature of 200° C. The pre-heating device (10) is so adjusted that above it is at a 5 mm distance and beneath at a 10 mm distance from the product. The temperature of the upper portion of the pre-heating device is 250° C., the temperature of its lower portion is 200° C. The width of the gap remaining between the guide rollers (13) and (14) is 15 mm. The auxiliary heater (15) is switched on and adjusted to a temperature of 350° C. The looping angle at the inlet is 0°. The temperature of the pressure roller is set to 400° C. at the surface, the surface of the pressure roller is smooth and chrome-plated. A very precise temperature must be maintained, the permissible variation being ±4° C. The friction of the pressure roller (2) relative to the calender supporting roller is 0%. The auxiliary roller heater (17) is adjusted at a distance of 0.1 mm. After the calender gap the product is guided via the guide roller (20), the looping angle is 30°, and the take off tension is 1%.

The product produced under said conditions has all the properties of a polyester foam and also shows an improvement with regard to resistance to tearing and rupture. The skin is watertight, oil-tight and gasoline-tight. It is resistant to gasoline, alcohol, mineral oil, grease; it has a high thermal insulation capability and is insensitive to dirt.

EXAMPLE 2

The product produced according to Example 2 is a polyester foam which is coated on one side. The foam may be used as a sealing material in air conditioning and similar installations. Polyester is used as a starting material and the produced product has a thickness of 1.6 mm. The initial weight is 30 kg/m$^3$ and one surface is sealed; the other surface is porous and has 16 to 22 cells per centimeter. The product may be dyed. The process of manufacture is the same as in Example 1. The product produced in this way is coated on one side, it has a high elasticity, a high elongation at break, a high tensile strength, and it is air- and water-repellent. However, the product is resistant to gasoline, alcohol, mineral oil, grease and water.

EXAMPLE 3

The product of this Example is a polyester of textile quality which is coated on one side, its surface is lightly grained and it is densely coated. The product is suitable as a surface material in the toy industry and may be used as a replacement for felt.

The used material is a polyester foam of textile quality with a thickness of 2 mm. Its initial weight is 30 kg/m$^3$, one surface is smooth and sealed and the other surface is porous and has 18 to 22 cells per centimeter. The material may be dyed.

A machine speed of 12 m/min. was used for carrying out the process and the product tension was 8%. Above the heating device (9) was at a 5 mm distance from the product and beneath at a 10 mm distance therefrom. The temperature was above and beneath 150° C. Above the pre-heating device was at a 5 mm distance from the product and beneath at a 10 mm distance therefrom. The temperature was 200° C. and 150° C. beneath. The shock heating device (11) was switched on, its distance from the product was 5 mm and the temperature was set to 360° C. The gap in the guide rollers (13) and (14) was 0.2 mm, the auxiliary heating was switched on and its temperature was set to 300° C. A roller with a smooth chrome-plated surface was used as a pressure roller. The temperature of the roller (3) was 410° C., the permissible variation being ±4° C. The friction between the rollers (2) and (3) was 20%. The auxiliary roller heater (17) was switched on, being at a 0.1 mm distance from the roller. The outlet angle was 30°, and the outlet tension was 3%.

The product prepared according to this process had all the specific properties of a polyester, only the fastness to light, the tensile strength and the elongation at break were improved over the starting material. The product had a good elasticity, a smooth surface being lightly grained, it could be punched and cut, it was water repellent, washable and resistant to gasoline, mineral oil, alcohol and grease.

EXAMPLE 4

The product produced in this Example is a polyester foam which is embossed on one side and a little coated inside the embossing, i.e. the nap. The material is suitable for sound reduction and thermal insulation in rooms as well as in the machine-building and automotive industry for lining or covering vibrating casings.

The material is a polyester foam having a thickness of 25 mm and a weight of 28 kg/m$^3$. The porosity is 18 to 22 cells per centimeter. The material may be dyed.

The process is carried out at a machine speed of 10 m/minute, the product tension being 10%. The heating device (9) is so adjusted that it acts upon the product only from above, whereby upward a distance of 5 mm is maintained between the heating device and the product, and the temperature is 150° C. The pre-heating device (10) also acts only from above, it is at a 5 mm distance from the product and is set at a temperature of 150° C. The shock heating device (11) is at a 5 mm distance from the product and is set to a temperature of 150° C. A gap of 25 mm is left between the guide rollers (13) and (14), and the auxiliary heater (15) is set to a temperature of 150° C. A roller with a bronzed and napped surface is used as the pressure roller (3). The temperature of the roller (3) is 330° C., the permissible variation of said temperature being ±5° C. No friction must occur between the rollers (2) and (3). The auxiliary roller heater (17) is switched on and is at a distance of 15 mm. The outlet angle from the roller gap is 0° and the outlet tension of the product is about 2%.

The polyester foam which was processed in this way has an improved elongation at break and tensile strength, the polyester foam becomes inherently stable, its surface gets enlarged and stabilized. The material is sound reducing, heat insulating and resistant to gasoline, alcohol, water, mineral oil and grease.

EXAMPLE 5

In this Example a polyester foam is produced which is coated on one side, has dense (compact) surface and is coarse grained. This product may be used as a sealing and insulation material in small machines and electric appliances. The material is a polyester foam with textile quality, the thickness is 6 mm and the initial weight is 30 kg/m$^3$. The product may be dyed.

The process was carried out at a machine speed of 5 m/minute and the product tension was 5%. The heating device (9) was switched on above and beneath. The distance was 10 mm above and beneath and the temperature above and beneath was 200° C. respectively. The pre-heating device (10) was run at the same distance and temperature as the heating device (9). The shock heating device (11) was adjusted at a 5 mm distance and its temperature was 300° C. The auxiliary heater (15) was also run and was set to a temperature of 220° C. A smooth steel roller was used as the pressure roller (3), it had a temperature of 420° C. with a permissible variation of ±4°. The friction between the rollers was 6%. The auxiliary roller heater (17) was switched on and adjusted at a distance of 1 mm. The sheet was guided around the guide roller (20), the looping angle was 25°, and the outlet tension of the product was 2%.

After this treatment the product retained all the properties of the polyester, but they were also partly improved. The coating was very dense, however, considerably grained. The tensile strength and elongation at break were high; the product was water-repellent, dirt-repellent, exceptionally airtight, resistant to decaying, and resistant to gasoline, alcohol, water, mineral oils and grease.

EXAMPLE 6

The product produced in this Example is a polyester foam embossed and coated on one side. It may be utilized for the isolation and absorption of sounds in the engine space of cars as well as in the machine-building industry. The product was produced with a machine speed of 10 m/second, the product tension being 3%. The heating device (9) was adjusted to 200° C. above and beneath, upwardly it was at a 5 mm distance from the product and downwardly at a 7.5 mm distance therefrom. The pre-heating device (10) worked under the same conditions, however, above it was adjusted to 250° C. The shock heating device (11) was at a 5 mm distance from the product and had a temperature of 250° C. The gap between the guide rollers (13) and (14) was 12 mm and the auxiliary heater (15) was switched on, and its temperature was set to 300° C. The pressure roller (3) was chrome-plated and napped. It was set to a temperature of 400° C. with a permissible variation of ±4° and a friction of 5% was provided over the roller (2). The auxiliary roller heater (17) was also switched on, and the height of the gap relative to the roller was 4 mm. The product was guided around the guide roller (20), the outlet angle being 0° at an outlet tension of the product of 1%.

The material treated according to this process showed the unchanged properties of the polyester foam. The surface was embossed and coated on one side as well as stabilized. This material is insensitive to dirt, it is water repellent, it has high sound absorption values and a good thermal insulation. It is resistant to gasoline, alcohol, water, mineral oil and grease. The product may be punched and cut.

EXAMPLE 7

The product produced according to this Example is a polyester foam coated on one side, which is utilizable as a sound isolation material in the automotive industry as well as the machine-building industry and for general construction. The material is hard and can be punched, it has a thickness of 14.3 mm. The initial weight is 18 kg/m$^3$. The material which is coated on one side has scattered open cells in an amount of 10 to 50 per centimeter, the opposite surface having 12 to 14 cells per centimeter. A coloring is possible.

For processing the material the speed of the machine was adjusted to 20 m/minute. The product tension was 3%. The heating device (9) was switched on above and beneath, and it was at a 10 mm distance in both directions. Its temperature was 150° C. The pre-heating device (10) was at the same distance, however it was adjusted to 250° C. above and to 150° C. beneath. The shock heating device (11), which was at a distance of 10 mm, was run with a temperature of 300° C. The distance between the guide rollers was 14 mm, and the auxiliary heater (15) was switched on and adjusted to 300° C. A smooth steel roller was used as the pressure roller (3), said roller being set to a temperature of 380° C. with a permissible variation of ±3°. The auxiliary roller heater (17) was also switched on, and it was at a distance of 10 mm. The guide roller (20) was adjusted to a looping angle of 30°, and the product was drawn off under a tension of 3°.

The material manufactured according to this process showed the properties of the polyester unchanged and partly improved. The product was coated on one side, it had a good permeability to air and water, and was insensitive to dirt. The product is resistant to gasoline, alcohol, mineral oil and grease, it has a high sound absorption and a good thermal insulation. It may be punched and cut.

EXAMPLE 8

The product according to Example 8 is a polyester coated on one side, which may be utilized in the toy industry. The material had a strength of 3 mm and an initial weight of 30 kg/m³. The coated side was closed and the opposite side was fine-pored with 18 to 22 cells per centimeter. The product could be dyed. For producing the product the machine speed was adjusted to 9 m/minute. Product tension was not employed and the heating device (9) was switched on only above. The heating device was at a distance of 10 mm from the product, and it had a temperature of 130° C. The pre-heating device (10) had the same temperature, however, it was only at a 5 mm distance from the product. The shock heating device (11) was at a 5 mm distance and had a temperature of 180° C. The height of the gap between the guide rollers (13) and (14) was 2 mm, and the auxiliary heater (15) was adjusted to 180° C. A bronzed smooth roller was used as the pressure roller (3), it was heated to a temperature of 390° C., whereby the permissible temperature variation had to be maintained within ±5° C. The friction between the rollers (2) and (3) was 5%. The auxiliary roller heater (17) was disposed at a distance of 0.2 mm from the roller. The product was guided around the guide roller (20), and said guide roller was so adjusted that the looping angle was 30°. The outlet tension of the product was 2%.

The thus treated material has a high elasticity, a hard surface, a leather-like graining; it is penetrable by air and washable as well as resistant to decaying.

EXAMPLE 9

According to this Example a polyester coated on one side is produced and furnished with self-sealing properties so that it is suitable for sadde cloths.

The material has a strength of 2.6 mm and an initial weight of 30 kg/m³. The coated side is closed, the opposite side is fine-pored with 18 to 22 cells per centimeter. The material may be dyed.

The product was produced at a machine speed of 6 m/minute, and the product tension was 4%. The heating device (9) was switched on only above. The distance from the heating device to the product was 5 mm, and the temperature of the heating device was 150° C. The pre-heating device (10) which was also switched on only above, was at a 5 mm distance from the product and was adjusted to 180° C. The shock heating device (11) was switched on and disposed at a distance of 5 mm from the product, its temperature being 220° C. The distance between the guide rollers (13) and (14) was 5 mm, and the auxiliary heater (15) was set at a temperature of 220° C. A smooth, chrome-plated roller was used as the pressure roller (3), its temperature was 380° C., and this temperature was precisely maintained with ±5° C. The friction between the rollers (2) and (3) was 2%, and the auxiliary roller heater (17) was at the distance of 0.3 mm from the roller. The outlet tension of the product was 1%.

The thus manufactured product had a high tensile strength and elongation at break, the coating prevented the seeping of the adhesive into the foam, this being a noticeable economy of the adhesive. The specific properties of the starting material were retained. The sadde cloths are washable and resistant to decaying.

EXAMPLE 10

In this Example a polyester was produced which was coated on one side and had a strength of 8 mm. The initial weight was 35 kg/m³. The treated material was coated on one side, the opposite surface was medium fine with 16 to 20 cells per centimeter.

A machine speed of 16 m/minute was worked with, the product tension was 4%. The heating device (9) was switched on only above; its distance from the product was 20 mm, and its temperature was 100° C. The preheating device (10) was also switched on only above, its distance from the product was also 20 mm, and its temperature was 150° C. The shock heating device (11) was disposed at a 5 mm distance from the product. The distance between the guide rollers (13) and (14) was 10 mm, and the temperature of the auxiliary heater (15) was 180° C. A smooth steel roller was used as the pressure roller (3) with a temperature of 290° C.±3°. The auxiliary roller heater was at a 1.5 mm distance from the product. The outlet tension of the product was 1%.

The material produced according to this process had an improved resistance to tearing and rupture, it was penetrable by air, resistant to gasoline, alcohol, mineral oil, grease and water. The thermal insulation is very good. The material is suitable for maintaining the warmth of a covered area.

EXAMPLE 11

In this Example a polyester foam was coated on one side and shaped with a rhombic pattern. The material is suitable as a table pad.

The polyester foam had a thickness of 5.5 mm, and its initial weight was 28 kg/m³. The material was fine-pored with 18 to 24 cells per centimeter.

The product was produced at a machine speed of 12 m/minute, and the product tension was 5%. The heating device (9) was switched on only above, its distance from the product was 15 mm, and its temperature was 180° C. The pre-heating device (10) was adjusted to the same values. The shock heating device (10) was at a 10 mm distance from the product, and its temperature was 200° C. The distance between the rollers (13) and (14) was 5 mm and the auxiliary heater (15) was adjusted to 220° C. A bronzed roller having a rhombic pattern was used as the pressure roller (3). The temperature of the pressure roller was 310° C.±3°. The auxiliary roller heater (17) was at a 2 mm distance from the roller. The guide roller (20) was used for returning, the looping angle was 30°, and the outlet tension of the product was 3%.

The product produced according to this Example was resistant to tearing, water-repellent, non skid, it shows a slight padding effect. The product protects the surface of a table and is washable.

EXAMPLE 12

In this Example a polyester foam coated on one side is produced, which is suitable for sealing, for sound isolation, and especially for application in the electrical industry. The material has a thickness of 5.3 mm, an initial weight of 30 kg/m³, it is fine-pored with 18 to 22 cells per centimeter.

The product was manufactured at a machine speed of 4 m/minute, and the product tension was 2%. The heating device (9) was switched on only above, its distance from the product was 8 mm, and its temperature was 120° C. The pre-heating device (10) was also switched on only above, its distance was 8 mm, and its temperature was 160° C. The shock heating device (11) was at a distance of 8 mm, and its temperature was 250° C. The distance between the guide rollers (13) and (14) was 5 mm and the angle to the horizontal line was 45°. The looping angle at the inlet was 45°. A smooth, chrome-plated roller having a temperature of 420° C.±5° was used as the pressure roller (3). The friction between the rollers (2) and (3) was 2%, and the auxiliary roller heated was at a distance of 1 mm from the roller. The outlet tension of the product was 2%. According to this process a product was produced which retained the original properties of the material, but in which, however, the resistance to tearing and rupture was improved. The sound isolation values are very high; the material is resistant to gasoline, alcohol, water, mineral oil and grease. Besides, the material is previous to air and water.

EXAMPLE 13

In this Example a polyester foam is compressed and coated on one side. The thickness is 0.4 mm, the initial weight is 30 kg/m$^3$, and the porosity is 18 to 24 cells per centimeter. The material may be dyed.

The product was manufactured at a machine speed of 12 m/minute, and the product tension was 5%. The heating device (9) was switched on only above, it was at a 5 mm distance from the product and had a temperature of 150° C. The pre-heating device (10) was also switched on only above, its distance from the product was 10 mm, and its temperature was 180° C. The shock-heating device (11) was switched on, its distance from the product was 5 mm, and its temperature was 200° C. The distance between the guide rollers (13) and (14) was 2 mm, the auxiliary heater (15) was adjusted to 200° C. A bronzed smooth roller with a temperature of 430° C.±5° was used as the pressure roller (3), whereby the friction to the roller (2) was adjusted to 4%. The auxiliary roller heater (17) was at a distance of 0.1 mm from the roller. The outlet tension of the product was 1%.

The thus produced material had an extremely high strength, a good damping effect and a good elasticity. It is resistant to gasoline, alcohol, water, mineral oil, grease. Besides, it is resistant to decaying.

EXAMPLE 14

In this Example a coated and embossed foam is produced, which is suitable for sound reduction and absorption in cars, and which is furnished with self-adhesive properties. The material has a thickness of 11 mm, an initial weight of 30 kg/m$^3$, the coated side has occasional open pores, the napped side has upwardly open napping and the deepenings (recesses) are coated.

The product was manufactured at a machine speed of 7 m/minute, and the product tension was 2%. The heating device (9) was switched on above and beneath. Its distance from the product was 10 mm respectively. Above the temperature was 130° C. and beneath 150° C. The pre-heating device (10) was also switched on above and beneath, and at the given time it was a 10 mm distance from the product. Above the temperature was adjusted to 150° C. and beneath to 180° C. The product was guided via the roller (18c). The shock heating device was switched on, it was at a distance of 5 mm, and its temperature was 180° C. The distance between the guide rollers (13) and (14) was 10 mm, and the distance to the horizontal line was 45°. A chrome-plated, bronzed, smooth or napped roller having a temperature of 330° or 410° C. was used as the pressure roller (3), the permissible temperature variations being 3° to 5° C. The friction between the rollers (3) and (2) was 0%, the auxiliary roller heater (17) was switched on and adjusted at a distance of 4 mm from the roller. The outlet tension of the product was 1%.

The thus manufactured product had a high sound reduction and absorption. The coated side is furnished with self-adhesive properties, and adhesives do not penetrate into the material. The product is resistant to gasoline, alcohol, mineral oil, grease and water.

EXAMPLE 15

In this Example a medium hard polyester foam is produced, which is on both sides connected with a polyester foam having a napped profile. This product can be used as a bump (shock) protection in a car, in the trunk and so forth.

The used material is a medium hard polyester and a soft polyester foam. The thickness of the medium hard polyester is 5 mm, the thickness of the soft polyester foam is 2 mm. The weight of the medium hard polyester is 25 kg/m$^3$, and the weight of the soft polyester is 30 kg/m$^3$. The medium hard polyester has a sealed surface, the soft polyester is fine-pored and the naps are open-pored.

The process according to this Example is carried out at a machine speed of 5 m/minute. The product tension is 2%. For the time being the heating device (9) and the pre-heating device (10) are only switched on above, they are at a distance of 10 mm and have a temperature of 150° C. The product tension of the second raw material transfer roller device is 2%. The heating device (9') is switched on above and beneath, it is at a distance of 5 mm respectively, above its temperature is 130° C. and beneath it is 150° C. The pre-heating device (10) is also switched on above and beneath, its distance is 5 mm, above its temperature is 130° C. and beneath 150° C. The shock heating device (11) is at a distance of 5 mm and has a temperature of 150° C. The distance between the guide rollers (13) and (14) is 8 mm, the product path is via the roller (18c), the auxiliary roller (15) is switched on and is set to a temperature of 150° C. The looping angle of the pressure roller (3) is 0° or 45°, and a bronzed, grooved roller is used as the pressure roller. The temperature of the pressure roller (3) is 370° C.±5°, and the friction to the roller (2) is 5%. The auxiliary roller heater (17) is switched on and is at a 2 mm distance from the roller. The product is guided over the guide roller (20), this resulting in an outlet angle of 45°, the product tension being maintained at 5%.

The thus manufactured product is non-skid, it has a high tensile strength, a very good padding effect, it is water repellent, resistant to gasoline, alcohol, mineral oil, grease or water.

EXAMPLE 16

According to this Example a polyester, which is coated and compressed on one side is produced. This polyester may be used as a sealing material in the machine-building or electrical industry. The material has a thickness of 3 mm, its initial weight is 30 kg/m$^3$, it is fine-pored with 20 to 24 cells per centimeter, and it has a closed coating. In this process a machine speed of 15 m/minute was worked with. The product tension during the rolling motion was 5%, the heating device (9) and the pre-heating device (10) were switched on only above. The distance of the heating device was 5 mm, its temperature was 150° C. The distance of the pre-heating device (10) was 15 mm and its temperature was 180° C. The shock heating device was switched on, its distance was 5 mm, and the temperature was 200° C. The distance of the guide rollers (13) and (14) was 4 mm, the auxiliary heater (15) was switched on, and its temperature was 200° C. A smooth steel roller was used as the pressure roller (3), said roller was heated to a temperature of 420° C., the permissible variation being ±5°. The friction between the rollers (2) and (3) was 4%. The auxiliary roller heater (17) was switched on, and its distance from the roller was 3 mm. The product was guided via the guide roller (19) and the outlet tension of the product was 2%.

The thus manufactured product had an extremely high strength, both the coating and the whole material. The product is resistant to gasoline, mineral oil, alcohol, grease and water; it shows a good sound isolation and reflection, and possesses high thermal insulation properties.

EXAMPLE 17

In this Example a polyester foam is produced which is embossed on two sides and lightly coated inside the embossing (copper). This polyester foam can be used as a carpet pad and interlayer for finished off rugs, runners and table-runners (stair-carpets) beneath installed, spanned carpet bottoms and carpet piles. The thickness of the material is 6 mm, the initial weight is 30 kg/m$^3$. The surface is open-pored at the crest with 18 to 20 cells per centimeter, the base has napped deepenings (recesses) which are coated, inside there are 18 to 200 per centimeter. Any color may be applied.

A machine speed of 8.5 m/minute was used, the product tension at the outlet was 5%. The heating device (9) was switched on above and beneath, its distance was 10 mm, and the temperature was 150° C. The pre-heating device (10) was switched on only above, its distance was 10 mm, and the temperature was 180° C. The shock heating device (11) was switched on, its distance was 10 mm, and its temperature was set to 250° C. The distance of the guide rollers (13) and (14) was 4 mm, the auxiliary heater was switched on, and its temperature was 150° C. A bronzed napped roller, heated to a temperature of 325° C.±3° was used as the pressure roller (3). The friction between roller (2) and roller (3) was 121%. The auxiliary roller heater (17) was switched on, its distance from the roller was 0.1 mm. The product was guided around the guide roller (20) and formed a looping angle of 45°. The outlet tension of the product was 5%.

The tensile strength and elongation at break of the thus manufactured product is improved over the starting material. The polyester product is inherently stable, the surface is enlarged and the nap-crest is open-pored so that the fibre of the carpet clutches thereto. Owing to the profilated surface and the elasticity of the crests the friction is increased and better nonskidding is achieved. The material is sound absorbing, it reduces the sound of steps, it shows a good thermal insulation, and it is resistant to decaying. The material is also resistant to gasoline, alcohol, water, mineral oil and grease. Finally, the product is machine washable and boil-proof.

EXAMPLE 18

The product of Example 18 is a polyester foam coated on two sides. The coating is holohedral, the opposite side has a leopard-pattern.

The product is suitable as a sealing and filter material in air conditioning.

The material is an extremely soft polyester foam having a thickness of 4.6 mm and an initial weight of 26 kg/m$^3$. The material may be dyed any color.

The material is manufacturable under various process conditions, therefore the machine speed may be 6 or 10 m/minute, and the product tension may be 10 or 20%. The heating device (9) is switched on above and beneath, above its distance is 5 mm, beneath it is 10 mm, and the temperature is 200° C. in both cases. The pre-heating device is also switched on above and beneath, the distances and the temperatures equal those of the heating device (9).

The shock heating device is switched on, its distance is 5 mm, and its temperature is 300° or 325° C. The distance of the guide rollers is 4.5 or 2 mm, and the angle to the horizontal line is 46° or 0°. Under the second process conditions the auxiliary heater is switched on and set to a temperature of 200° C. The looping angle at the inlet is 45° in the first case, 0° in the second case, a chrome-plated smooth roller is used as the pressure roller (3) in both cases. In the first case the temperature of the roller is about 390° C., in the second case—about 360° C. The permissible temperature variation is ±4° in the first case, in the second case it is ±3°. The friction between both the rollers is adjusted to 5% in the first case, and to 15% in the second case. In the first case the auxiliary roller heater (17) is at a distance of 0.3 mm from the roller, in the second case it is at a distance of 0.5 mm from the roller. In the first case guide roller (20) is used, in the second case it is not used. The outlet angle is 10° in the first case and 3° in the second case.

The obtained product has a closed coating on one side and a high permeability to air, it is repellent to dirt. The surface, which is opposite the closed coating, has a leopard-pattern. The material has the highest permeability, however, it is repellent to dirt. The specific properties of the starting material are not changed, only the resistance to tearing and rupture is improved. The material may be punched and cut, it has a high elasticity.

EXAMPLE 19

In this Example a hydrophilic foam is manufactured which is embossed with pile on both sides. The product is suitable as a duster or as a rag for household needs, primarily for high mechanical stresses. The thickness of the material is 5.2 mm, the initial weight is 30 kg/m$^3$. The product has open pores.

The product is manufactured at a machine speed of 4 m/minute, no product tension is employed. The heating device is switched on above and beneath, its distance is 10 mm, and the temperature is 150° C. accordingly. The pre-heating device (10) is also switched on; above its distance is 10 mm, and the temperature is 200° C. The product tension of the raw material transfer roller device B is 1%. The product of the raw material transfer roller device B is guided via the roller (18c). The shock heating device is switched on, it is at a distance of 10 mm, its temperature is 200° C. The distance between the guide rollers (13) and (14) is 6 mm. The looping angle at the inlet of the pressure roller (3) is 60°, and a bronzed, napped roller is used. The temperature of the pressure roller (3) is 310° C.±3°. The auxiliary heater is at a distance of 0.5 mm. The outlet tension is 1%.

The hydrophilic properties of the foam are retained in the thus produced product. Owing to the pile on both sides the material has the highest strength. Owing to the embossing the surface is enlarged and therewith the absorption of water is improved.

EXAMPLE 20

The product of Example 20 is a hydrophilic polyester foam embossed on one side with slight crest formation, inside the naps are a little coated. This product is suitable as a cloth for polishing, wiping or as a cleaning rag for bar counters.

The product is manufactured at a machine speed of 15 m/minute. The product tension at the inlet is 5%; the heating device (9) is adjusted at a 10 mm distance above and beneath, and set to a temperature of 150° C. The preheating device (10) is at a 10 mm distance and has a temperature of 200° C. The distance between the guide rollers (13) and (14) is 6 mm, the auxiliary heater (15) is switched on and adjusted to 200° C. A bronzed napped roller is adjusted to a temperature of 290° C.±3° and used as the pressure roller (3). The auxiliary roller heater (17) is also switched on, and is adjusted at a distance of 0.2 mm. The product is guided around the guide roller (20) and forms a looping angle of 30°; the outlet tension is 1%.

Owing to the embossed and stabilized surface the thus produced product gets a high strength, and, therefore, can be utilized as a cloth for household needs. Its resistance to tearing and rupture is also high. The hydrophilic properties of the starting material are fully retained, owing to its enlarged surface the effectiveness is even considerably improved.

EXAMPLE 21

The product in this Example is a polyester foam which is joined with an embossed polyester foam on both sides. Said material is suitable as a nonskid mat in the trunk of a car, as a sound reflecting and absorbing door lining in cars, as a protection withstanding damage caused by shocks.

The materials are polyethylene foam and polyester foam, the thickness of the polyethylene foam is 7 mm, and the thickness of the polyester foam is 3 mm. The polyethylene foam has an initial weight of 30 kg/m$^3$, whereby the initial weight of the polyester foam is 25 kg/m$^3$. The surface of the polyethylene is coated, the surface of the polyester has open-pored crests, and has 16 to 20 cells per centimeter. Inside the crests are coated. The material may be colored any color.

The product is manufactured at a machine speed of 10 m/minute, the heating device (9) is switched on only above, its distance is 10 mm, and its temperature is 150° C. The pre-heating device (10) is also switched on only above, it is at a distance of 10 mm, and its temperature is 200° C. The product is drawn off from the raw material transfer roller device with a product tension of 3%. The heating device (9') is switched on above and beneath, it is at a distance of 5 mm accordingly, and its temperature is 200° C. The pre-heating device (10') is also switched on above and beneath; in both cases it is at a distance of 10 mm, the temperature above being 200° C. and beneath 250° C. The distance between the guide rollers (13) and (14) is 10 mm, and the auxiliary heater (15) is set to a temperature of 300° C. The pressure roller (3) is bronzed and napped, and adjusted to a temperature of 390° C.±4°. The friction between the rollers (2) and (3) is 4%. The auxiliary roller heater (17) is also switched on, and it is at a 10 mm distance from the roller. The outlet tension of the product is 1%.

The thus manufactured product fully retains the properties of the polyethylene foam. Due to the fact that the polyester foam and the polyethylene foam are firmly joined, the polyester obtains the same coefficients of elongation at break and tensile strength as the polyethylene foam. The nonskid effect results from the profile and elasticity of the surface. The polyester foam is strengthened, it is stabilized as to form and surface. The sound isolation and reflection properties are good, the thermal insulation value is high, the material withstands shocks, it is repellent to water and resistant to gasoline, alcohol, water, mineral oil and grease; besides, it is resistant to decaying.

EXAMPLE 22

The product of this Example is a polyethylene foam joined with a polyester foam which is embossed on one side. This product is glued with a thicker polyethylene foam and manufactured into nonskid door-, sport- and gymnastics mats.

The polyethylene foam is coated on both sides, the polyester foam is of textile quality. The total thickness is 5.7 mm, the thickness of the polyethylene is 4.5 mm, the initial thickness of the polyester is 2.2 mm. The initial weight of the polyester is 30 kg/m$^3$, the initial weight of the polyethylene is also 30 kg/m$^3$. The polyethylene has closed cells, the polyester has half-open crests and the number of cells per centimeter is 16 to 18. The remainder is coated. Any color may be applied to the product.

The product was manufactured at a machine speed of 12 m/minute, and the product tension when being drawn off was 2%. The heating device (9) and the pre-heating device (10) were switched on only above; in both cases the distance was 5 mm, and the temperature was 130° C. For the second product, drawn off by the upper roller, the heating device (9') and the pre-heating device (10') were switched on above and beneath; the distance was always 5 mm, and the temperature was always 150° C. The shock heating device (11) was also switched on, the distance was 5 mm, and the temperature was 150° C. The distance between the guide rollers (13) and (14) was 6.5 mm, the auxiliary heater (15) was switched on and set to a temperature of 150° C. A chrome-plated, napped roller heated to a temperature of 350° C.±4° was used as the pressure roller (3). The auxiliary roller heater (17) was switched on and adjusted at a distance of 3 mm from the roller. The outlet tension of the product was 2%.

The properties of the polyethylene remained unchanged in the thus manufactured product. The polyester foam adapts to the resistance of tearing and rupture; it is stabilized and nondeformable. High nonskidding is achieved through the profile and elasticity of the material reacting to pressure in reciprocal action. The material is dampproof and water repellent.

EXAMPLE 23

This Example relates to a flame-resistant polyether which is coated on one side. The product may be used as a sound isolation material in the automotive and heavy machine-building industries. The material has a thickness of 9.2 mm, the initial weight of the polyether is 30 kg/m$^3$, the initial weight of the polyester is 28 kg/m$^3$. The coating is closed, the opposite side is medium fine, having 16 to 20 cells per centimeter. The material may be dyed.

The product was manufactured at a machine speed of 13 m/minute. The heating device (9) was adjusted to a distance of 15 mm, its temperature was 130° C. The heating took place only from above. The pre-heating device (10) was also only switched on above, it was at a distance of 5 mm, and its temperature was 150° C. The product drawn off from the upper roller had a product tension of 2%. The heating device (9') was switched on above and beneath, and was at a 5 mm distance accordingly. Above the temperature was 130° C., and below it was 150° C. The pre-heating device (10') was also switched on above and beneath, its distance was 5 mm accordingly. Above its temperature was 130° C. and beneath 180° C. The distance between the guide rollers (13) and (14) was 10 mm. The auxiliary heater (15) was switched on and set to a temperature of 200° C. A smooth, chrome-plated roller was used as the pressure roller (3). Said roller was heated to 390° C.±5°. The friction between the rollers (2) and (3) was 2%. The auxiliary roller heater was switched on; it was at a 4 mm distance from the roller. The material was guided around the guide roller (20) and had an outlet angle of 45°. The outlet tension of the product was 2%.

The thus manufactured product had very good sound isolation properties, a good resistance to tearing and rupture, it was penetrable by air and pervious to water, flame-resistant, and in conformity with the AMSO-instructions, resistant to gasoline, alcohol, mineral oil, grease and water.

EXAMPLE 24

This product is a polyether foam coated on one side with polyester. The product is suitable as a sound reduction material in a car, especially in the engine space. However, it can also be used in the machine-building industry, especially in large-scale electrical machine-building. The product has a thickness of 14.1 mm, the initial weight of the polyether is 22 kg/m$^3$, the initial weight of the polyester is 25 kg/m$^3$. One surface is closed, the opposite surface has 16 to 20 cells per centimeter. The product may be colored.

The product was manufactured at a machine speed of 6 m per minute. The product tension when drawn off was 10%. The heating device (9) was switched on; above it was at a 5 mm distance, and beneath at a 10 mm distance from the product. The temperature was 200° C. above and beneath. The pre-heating device (10) was also switched on; above the distance was 5 mm and beneath 10 mm, the temperature was adjusted to 200° C. above and beneath. The shock heating device (11) was switched on, its distance was 5 mm, and the temperature was set to 300° C. The distance between the guide rollers (13) and (14) was 4.5 mm, and the angle to the horizontal line was 46°. The looping angle at the inlet into the pressure roller (3) was adjusted to 45°; a smooth, chrome-plated roller was used; said roller was heated to a temperature of 390° C.±4°. The friction between the rollers (2) and (3) was 5%. The auxiliary roller heater (17) was switched on and adjusted at a distance of 0.3 mm. The material leaving the roller gap was guided around the guide roller (20), whereby a looping angle of 60° was formed. The outlet angle was 10°.

EXAMPLE 25

This Example deals with a carpet which is joined with an embossed polyester beneath. The total thickness of the carpet is 7.5 mm, the thickness of the polyester material is 2 mm. The initial weight of the polyester is 30 kg/m$^3$. The polyester material is open-pored with 16 to 22 cells per centimeter. Any color may be applied to the material. The product is manufactured at a machine speed of 8 m/minute. The material is drawn off without any product tension. The carpet material is drawn off from the product transfer roller device B with a product tension of 5%. The heating device (9') for the polyester material is switched on above and beneath, it is at a distance of 5 mm and has a temperature of 250° C. The pre-heating device (10') is also switched on above and beneath, and adjusted to the same values as the heating device (9'). The gap between the guide rollers (13) and (14) is 4 mm, the auxiliary heater (15) is switched on and set to 100° C. The looping angle at the inlet is 45° or 0°. A bronzed, napped roller is used as the pressure roller (3). The temperature of the pressure roller (3) is adjusted to 340° C.±3°. The auxiliary roller heater (17) is switched on; it is at a distance of 3 mm from the roller. The outlet angle is 1°.

The carpet material produced in this way is suitable for laying out nonskid carpeted floors so that single pieces may be manufactured for different application purposes. The material is nonskid, it is pleasant and comfortable to walk on it, it has a long life span.

EXAMPLE 26

The product of this Example is a polyester foam which is coated with a sponge foam on one side. This product is suitable as bathroom mats, especially for commercial needs, e.g. in hotels.

The employed materials are polyester and sponge foam. The total thickness is 11 mm and the initial weight is 25 kg/m$^3$. The material has large pores and may be dyed any color.

The same process as in Example 15 is used for manufacturing the product. The thus produced material is nonskid, dampproof and washable.

We claim:

1. A process for the continuous modification of the surface portion only of a foamed plastic web to impart high mechanical resistance with retention of air permeability and elasticity, which comprises preheating the web to a temperature below its melting point, then subjecting the preheated web to shock heating by means of a device disposed at a distance of 5 to 10 mm from the web and at a temperature of from 150° C. to 300° C., and then passing the preheated and shock heated web through the nip of a calender comprising a pressure roller and a backing roller, the pressure roller being heated to a predetermined temperature above the melting point of the web and up to 500° C., the web being fed to the calender nip in such a way that it is looped around the pressure roller through an angle of at least 30° and is then withdrawn from the calender and wound up.

2. A process as claimed in claim 1, wherein the web, after preheating and shock heating, and before entering the calender nip, is compressed by means of a pair of rollers.

3. A process as claimed in claim 2, wherein the web, after being preheated, shock heated and compressed, and before entering the calender nip, is exposed to the action of an auxiliary heater.

4. A process as claimed in claim 1, wherein the pressure roller is heated from the interior and is additionally heated from the exterior.

* * * * *